US012459206B2

(12) United States Patent
Tsunoya et al.

(10) Patent No.: US 12,459,206 B2
(45) Date of Patent: Nov. 4, 2025

(54) THREE-DIMENSIONAL SHAPING DEVICE

(71) Applicant: Seiko Epson Corporation, Tokyo (JP)

(72) Inventors: Akihiko Tsunoya, Okaya (JP);
Toshimitsu Hirai, Hokuto (JP); Kaoru Momose, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 61 days.

(21) Appl. No.: 17/381,742

(22) Filed: Jul. 21, 2021

(65) Prior Publication Data
US 2022/0024137 A1 Jan. 27, 2022

(30) Foreign Application Priority Data

Jul. 23, 2020 (JP) .................... 2020-125893

(51) Int. Cl.
B29C 67/00 (2017.01)
B22F 10/85 (2021.01)
B22F 12/53 (2021.01)
B28B 1/00 (2006.01)
B28B 17/00 (2006.01)
B29C 64/209 (2017.01)
B29C 64/393 (2017.01)
B33Y 30/00 (2015.01)
B33Y 50/02 (2015.01)

(52) U.S. Cl.
CPC ............ B29C 64/393 (2017.08); B22F 10/85 (2021.01); B22F 12/53 (2021.01); B28B 1/001 (2013.01); B28B 17/0081 (2013.01); B29C 64/209 (2017.08); B33Y 30/00 (2014.12); B33Y 50/02 (2014.12)

(58) Field of Classification Search
CPC ..... B29C 64/393; B29C 64/209; B29C 64/35; B33Y 10/00; B33Y 10/30; B33Y 50/00; B33Y 50/02; B33Y 40/00; B22F 12/53; B22F 10/85; B28B 1/001
See application file for complete search history.

(56) References Cited

U.S. PATENT DOCUMENTS

| | | | |
|---|---|---|---|
| 2018/0170058 A1* | 6/2018 | Shih | B29C 64/00 |
| 2018/0178533 A1* | 6/2018 | Sakai | B22F 12/53 |
| 2018/0354192 A1 | 12/2018 | Iwase et al. | |
| 2019/0030900 A1 | 1/2019 | Iwase | |
| 2020/0406542 A1* | 12/2020 | Bennett | B29C 64/245 |
| 2020/0406558 A1* | 12/2020 | Nakai | B28B 1/001 |

FOREIGN PATENT DOCUMENTS

| | | | |
|---|---|---|---|
| CN | 104411499 | 3/2015 | |
| JP | 57-131566 | 8/1982 | |
| JP | 2019-001010 | 1/2019 | |
| WO | WO-2019178086 A1 * | 9/2019 | B29C 64/10 |

* cited by examiner

Primary Examiner — Ryan M Ochylski
(74) Attorney, Agent, or Firm — WORKMAN NYDEGGER

(57) ABSTRACT

A three-dimensional shaping device includes: a shaping table; a layer forming unit configured to form a powder layer on the shaping table; a head configured to eject a liquid containing a binder from a nozzle to a shaping region; and a control unit configured to control movement of the head with respect to the shaping table and driving of the head by applying a voltage. The control unit executes a first flushing operation when an area of the shaping region is equal to or greater than the threshold value, and executes a second flushing operation when the area of the shaping region is less than the threshold value.

7 Claims, 10 Drawing Sheets

THREE-DIMENSIONAL SHAPING DEVICE

The present application is based on, and claims priority from JP Application Serial Number 2020-125893, filed Jul. 23, 2020, the disclosure of which is hereby incorporated by reference herein in its entirety.

BACKGROUND

1. Technical Field

The present disclosure relates to a three-dimensional shaping device.

2. Related Art

In related art, various types of three-dimensional shaping devices have been used. Among the devices, there is a three-dimensional shaping device that forms a powder layer and ejects a liquid containing a binder from a nozzle to a shaping region of a three-dimensional shaped object in the powder layer to manufacture a three-dimensional shaped object. For example, JP-A-2019-1010 discloses a three-dimensional shaping device that forms a layer of a powder material and ejects a curing liquid from a nozzle of a line head to the layer to manufacture a three-dimensional shaped object.

In the three-dimensional shaping device described in JP-A-2019-1010, a flushing stage for executing a flushing operation of ejecting a curing liquid from a nozzle is formed. A foreign substance in the nozzle is removed by the flushing operation. In order to simplify the control during the flushing operation, the flushing operation is generally performed under the same ejection conditions as when the three-dimensional shaped object is shaped, that is, when the liquid is ejected to a shaping region of the three-dimensional shaped object. However, in recent years, the three-dimensional shaped object is manufactured with various materials, and various kinds of powder are used. Therefore, depending on the powder to be used, a large amount of powder may float up and be mixed into the nozzle. The possibility of the powder floating up and mixed into the nozzle is increased as a time during which a head is moved on the powder layer in an idle running state without ejection becomes longer. When the powder mixed into the nozzle cannot be removed, a liquid ejection failure or the like may occur.

SUMMARY

In order to solve the above problems, a three-dimensional shaping device according to the present disclosure includes: a shaping table; a layer forming unit configured to form a powder layer on the shaping table; a head configured to eject a liquid containing a binder from a nozzle to a shaping region of a three-dimensional shaped object on the powder layer; and a control unit configured to control movement of the head with respect to the shaping table and driving of the head by applying a voltage, and to control the head to execute a flushing operation at a flushing position which is a position different from the shaping region, in which the control unit is configured to control the head to execute a first flushing operation when an area of the shaping region is equal to or greater than a threshold value, and control the head to execute a second flushing operation under a flushing condition different from that of the first flushing operation when the area of the shaping region is less than the threshold value.

DESCRIPTION OF EXEMPLARY EMBODIMENTS

Figure 1:
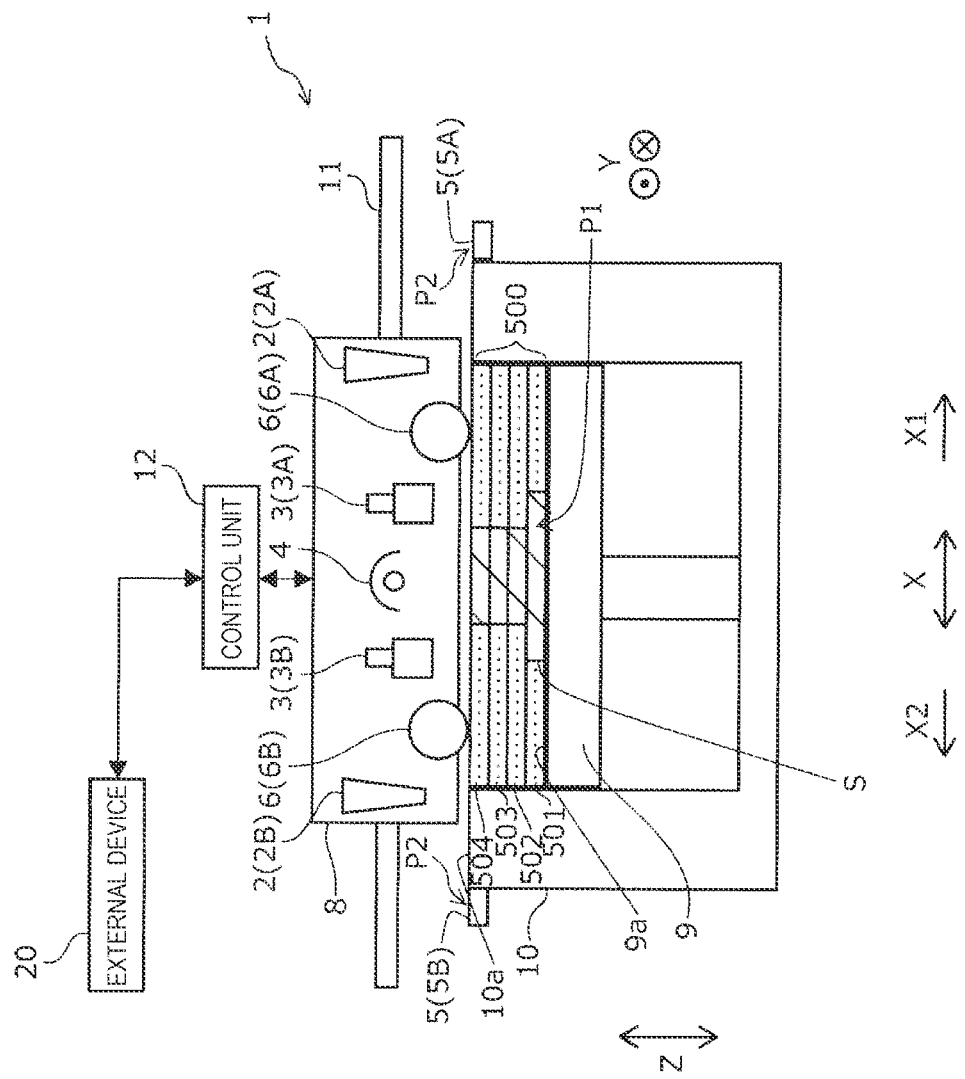
FIG. 1 is a schematic configuration diagram showing a three-dimensional shaping device according to an embodiment of the present disclosure.

First, the present disclosure will be schematically described.

In order to solve the above problems, a three-dimensional shaping device according to a first aspect of the present disclosure includes: a shaping table; a layer forming unit configured to form a powder layer on the shaping table; a head configured to eject a liquid containing a binder from a nozzle to a shaping region of a three-dimensional shaped object on the powder layer; and a control unit configured to control movement of the head with respect to the shaping table and driving of the head by applying a voltage, and to control the head to execute a flushing operation at a flushing position which is a position different from the shaping region, in which the control unit is configured to control the head to execute a first flushing operation when an area of the shaping region is equal to or greater than a threshold value, and control the head to execute a second flushing operation under a flushing condition different from that of the first flushing operation when the area of the shaping region is less than the threshold value.

According to the present aspect, the first flushing operation is executed when the area of the shaping region is equal to or greater than the threshold value, and the second flushing operation is executed under the flushing condition different from that of the first flushing operation when the area of the shaping region is less than the threshold value. That is, the flushing condition is made different between a case where the area of the shaping region is wide and a case where the area of the shaping region is narrow. Here, when the liquid is discharged to the powder layer, a portion at which the liquid is discharged becomes wet and the powder is less likely to float up. That is, the fact that the area of the shaping region is wide means that the region in which the powder is less likely to float up is wide, and the fact that the area of the shaping region is narrow means that the region in which the powder is less likely to float up is narrow. For this reason, according to the present aspect, when the area of the shaping region is narrow and the time during which the head is moved on the region of the powder layer that is not wet due to the liquid in an idle running state becomes long, it is possible to discharge the ink in the head under a condition in which a flushing effect is high. Therefore, it is possible to prevent the powder mixed into the nozzle from not being removed even though the flushing operation is performed.

The three-dimensional shaping device according to a second aspect of the present disclosure is directed to the first aspect, in which a frequency of a waveform input to the head in the second flushing operation is higher than a frequency of a waveform input to the head in the first flushing operation.

In general, when the area of the shaping region is narrow and the time during which the head is moved on the region of the powder layer that is not wet due to the liquid in an idle running state becomes long, a larger amount of powder tends to be mixed into the nozzle, and it is difficult to discharge the powder mixed into the nozzle in many cases. However, according to the present aspect, the frequency of the waveform input to the head in the second flushing operation is higher than the frequency of the waveform input to the head in the first flushing operation. When the frequency of the waveform input to the head is increased, the powder mixed into the nozzle can be effectively discharged, and therefore, according to the present aspect, the powder mixed into the nozzle can be effectively discharged even when the area of the shaping region is narrow and the time during which the head is moved on the region of the powder layer that is not wet due to the liquid in an idle running state becomes long.

The three-dimensional shaping device according to a third aspect of the present disclosure is directed to the first aspect or the second aspect, in which a voltage to be applied to the head in the second flushing operation is higher than a voltage to be applied to the head in the first flushing operation.

According to the present aspect, the voltage applied to the head in the second flushing operation is higher than the voltage applied to the head in the first flushing operation. When the voltage applied to the head is increased, the powder mixed into the nozzle can be effectively discharged, and therefore, according to the present aspect, the powder mixed into the nozzle can be effectively discharged even when the area of the shaping region is narrow and the time during which the head is moved on the region of the powder layer that is not wet due to the liquid in an idle running state becomes long.

The three-dimensional shaping device according to a fourth aspect of the present disclosure is directed to any one of the first aspect to the third aspect, in which an ejection speed of the liquid from the head in the second flushing operation is faster than an ejection speed of the liquid from the head in the first flushing operation.

According to the present aspect, the ejection speed of the liquid from the head in the second flushing operation is faster than the ejection speed of the liquid from the head in the first flushing operation. When the ejection speed of the liquid from the head is increased, the powder mixed into the nozzle can be effectively discharged, and therefore, according to the present aspect, the powder mixed into the nozzle can be effectively discharged even when the area of the shaping region is narrow and the time during which the head is moved on the region of the powder layer that is not wet due to the liquid in an idle running state becomes long.

The three-dimensional shaping device according to a fifth aspect of the present disclosure is directed to any one of the first aspect to the fourth aspect, in which a droplet size of the liquid ejected from the head in the second flushing operation is larger than a droplet size of the liquid ejected from the head in the first flushing operation.

According to the present aspect, the droplet size of the liquid ejected from the head in the second flushing operation is larger than the droplet size of the liquid ejected from the head in the first flushing operation. When an ejection amount of the liquid from the head is increased, the powder mixed into the nozzle can be effectively discharged, and therefore, according to the present aspect, the powder mixed into the nozzle can be effectively discharged even when the area of the shaping region is narrow and the time during which the head is moved on the region of the powder layer that is not wet due to the liquid in an idle running state becomes long.

The three-dimensional shaping device according to a sixth aspect of the present disclosure is directed to any one of the first aspect to the fifth aspect, in which the head includes a pressure chamber communicating with the nozzle, a supply path configured to supply the liquid to the pressure chamber, and a circulation path into which the liquid from the pressure chamber flows for circulation.

According to the present aspect, the head includes the circulation path for circulating the liquid. Therefore, by circulating the liquid, it is possible to prevent precipitation of a solid component contained in the liquid, and it is possible to prevent a problem associated with precipitation of the solid component.

The three-dimensional shaping device according to a seventh aspect of the present disclosure is directed to the sixth aspect, in which the control unit is configured to control such that $q2/q1$ is equal to or greater than 0.05 and equal to or less than 20, where $q1$ is a flow rate of the liquid flowing into the circulation path per unit time, and $q2$ is a maximum flow rate of the liquid ejected from the nozzle per unit time.

According to the present aspect, the flow rate of the liquid flowing into the circulation path is controlled within an appropriate range. As a result, it is possible to prevent an increase in a pressure difference between a pressure applied to the liquid in the nozzle and an outside air pressure. By preventing an increase in the pressure difference, it is possible to prevent mixing of powder into the nozzle.

The three-dimensional shaping device according to an eighth aspect of the present disclosure is directed to the seventh aspect, in which $q2/q1$ is 0.05.

According to the present aspect, the flow rate of the liquid flowing into the circulation path is controlled within a particularly preferable range. As a result, it is possible to particularly effectively prevent an increase in the pressure difference between the pressure applied to the liquid in the nozzle and the outside air pressure, and it is possible to particularly effectively prevent mixing of the powder into the nozzle.

Hereinafter, an embodiment of the present disclosure will be described with reference to accompanying drawings.

First, an embodiment of a three-dimensional shaping device 1 according to the present disclosure will be described with reference to FIG. 1. Here, in FIG. 1 and the drawings to be described later, an X direction is a horizontal direction and corresponds to a reciprocating direction of a supply unit 8, and an X1 direction corresponds to a forward direction and an X2 direction corresponds to a backward direction. A Y direction is a horizontal direction and a direction orthogonal to the X direction, and corresponds to a direction in which a rotation shaft of a roller 6 extends. A Z direction is a vertical direction and corresponds to a lamination direction of layers 500.

The term "three-dimensional shaping" in this description refers to forming a so-called three-dimensional shaped object, and includes, for example, forming a shape having a thickness even in a shape of a flat plate shape that is a so-called two-dimensional shape.

The three-dimensional shaping device 1 according to the present embodiment is a three-dimensional shaping device that manufactures a three-dimensional shaped object by laminating the layers 500 including a layer 501, a layer 502, a layer 503, . . . , and a layer 50n. As shown in FIG. 1, the three-dimensional shaping device 1 according to the present embodiment includes a table unit 10 that includes a shaping table 9, the supply unit 8 that supplies a shaping material of the three-dimensional shaped object to the shaping table 9, and a control unit 12 that controls operations of the table unit 10 and the supply unit 8. The three-dimensional shaping device 1 is electrically coupled to an external device 20 such as a personal computer, and is configured to receive an instruction from a user via the external device 20.

The shaping table 9 is configured to be movable in the Z direction under control of the control unit 12. A shaping surface 9a of the shaping table 9 is disposed at a position lower than an upper surface portion 10a of the table unit 10 by a predetermined distance in the Z direction, and the shaping material of the three-dimensional shaped object is supplied from the supply unit 8 to the shaping surface 9a to form one layer of the layers 500. Then, laminating is performed by repeating a downward movement of the shaping table 9 by a predetermined distance and a supply of the shaping material of the three-dimensional shaped object from the supply unit 8. FIG. 1 shows a state where a structure S of the three-dimensional shaped object is formed at the shaping surface 9a by repeating a formation of four layers of the layer 501, the layer 502, the layer 503, and a layer 504.

The supply unit 8 is configured to be movable in the X direction along a guide bar 11. In addition, the supply unit 8 includes shaping material supply units 2 that supply the shaping material including powder of metal, ceramics, resin, or the like to the shaping table 9. The shaping material supply units 2 include a shaping material supply unit 2A formed at a head side end portion in the X1 direction and a shaping material supply unit 2B formed at a head side end portion in the X2 direction.

The supply unit 8 includes the rollers 6 that can compress and level the shaping material supplied to the shaping table 9. The rollers 6 include a roller 6A formed next to the shaping material supply unit 2A in the X direction and a roller 6B formed next to the shaping material supply unit 2B in the X direction. Here, the shaping material supply units 2 and the rollers 6 constitute a layer forming unit that forms the layers 500, which are powder layers, at the shaping table 9. The supply unit 8 may include a squeegee that can level the shaping material supplied to the shaping table 9 instead of the roller 6.

The supply unit 8 includes heads 3 that eject, to a shaping region P1 of the three-dimensional shaped object, a liquid containing a binder for binding powder contained in the shaping material supplied from the shaping material supply units 2. The heads 3 include a head 3A formed next to the roller 6A in the X direction and a head 3B formed next to the roller 6B in the X direction. Here, the liquids ejected from the head 3A and the head 3B are the same liquid, and both are liquids containing an ultraviolet curing resin as a binder. It is noted that the liquid is not limited to such a liquid, and a liquid containing a thermosetting resin as a binder, a liquid in which a solid resin as a binder is dissolved in a volatile solvent, or the like may be used.

An ultraviolet ray irradiation unit 4 that performs irradiation with ultraviolet rays that can cure the ultraviolet curing resin is provided between the head 3A and the head 3B in the X direction. The supply unit 8 according to the present embodiment includes one ultraviolet ray irradiation unit 4, but may include two or more ultraviolet ray irradiation units 4, or not include the ultraviolet ray irradiation unit 4 according to a type of the liquid to be used, or include a heater for curing the thermosetting resin or volatilizing the solvent instead of the ultraviolet ray irradiation unit 4, or the like.

As shown in FIG. 1, in the supply unit 8 according to the present embodiment, shapes of constituent members are symmetrical in the X direction. Therefore, the three-dimensional shaping device 1 according to the present embodiment can execute a shaping operation of the three-dimensional shaped object while moving the supply unit 8 in the X1 direction, and execute the shaping operation of the three-dimensional shaped object while moving the supply unit 8 in the X2 direction.

Further, as shown in FIG. 1, in the three-dimensional shaping device 1 according to the present embodiment, liquid receiving units 5 are provided on the table unit 10, and a flushing operation is executed by ejecting a liquid from the head 3 at a position facing the liquid receiving unit 5. That is, the position facing the liquid receiving unit 5 is a flushing position P2, and thus the flushing position P2 is certainly different from the shaping region P1 of the three-dimensional shaped object. The liquid receiving units 5 include a liquid receiving unit 5A and a liquid receiving unit 5B.

As described above, the three-dimensional shaping device 1 according to the present embodiment includes the shaping table 9, the shaping material supply units 2 and the rollers 6 which are serving as the layer forming unit that forms, at the shaping table 9, the layers 500 which are powder layers, the heads 3 that eject, from a nozzle, a liquid containing a binder to the shaping region P1 of the three-dimensional shaped object in the layers 500, and the control unit 12 that controls movements of the heads 3 with respect to the shaping table 9 and driving of the heads 3 by applying a voltage. After the liquid is ejected to the shaping region P1, the control unit 12 applies a voltage to the head 3 at the flushing position that is different from the shaping region P1 to execute the flushing operation of ejecting the liquid from the nozzle N. In the three-dimensional shaping device 1 according to the present embodiment, the position facing the liquid receiving unit 5 is defined as the flushing position P2, but the flushing position is not limited thereto, and, for example, a region different from the shaping region P1 on the shaping surface 9a may be used as the flushing position P2.

The three-dimensional shaping device 1 according to the present embodiment includes a liquid supply system 40 that supplies the liquid to the head 3. Hereinafter, the liquid supply system 40 and the head 3 will be described in detail with reference to FIGS. 2 to 5. Here, the liquid supply system 40 shown in FIG. 2 includes a circulation unit 41 including a supply flow path 45a for supplying the liquid to the head 3, and a replenishment unit 42 including a liquid replenishment flow path 45d for replenishing the circulation unit 41 with a liquid.

Figure 2:
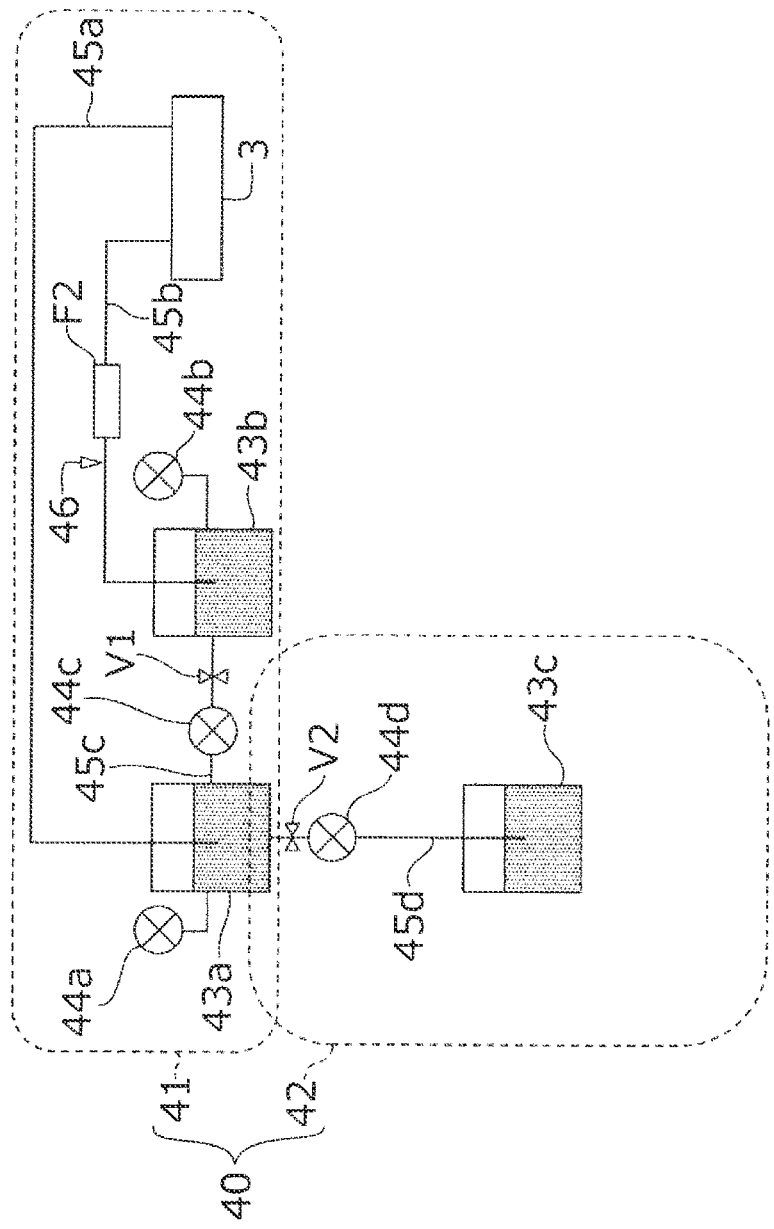
FIG. 2 is a schematic diagram showing a liquid sharing system of the three-dimensional shaping device in FIG. 1.

First, the liquid supply system 40 will be described. As shown in FIG. 2, the circulation unit 41 includes the heads 3, a pressure increase control liquid tank 43a, a pressure reduction control liquid tank 43b, a pressure increase control pump 44a, a pressure reduction control pump 44b, a flow pump 44c, and an electromagnetic valve V1. The circulation unit 41 includes a supply flow path 45a that couples the pressure increase control liquid tank 43a and the head 3, a first circulation flow path 45b that couples the head 3 and the pressure reduction control liquid tank 43b, and a second circulation flow path 45c that couples the pressure increase control liquid tank 43a and the pressure reduction control liquid tank 43b. Here, the first circulation flow path 45b is provided with a filter F2 and a flow rate sensor 46 that detects a flow rate of the liquid flowing through the first circulation flow path 45b.

Differential pressure control is performed by the pressure increase control liquid tank 43a, the pressure increase control pump 44a, the pressure reduction control liquid tank 43b, and the pressure reduction control pump 44b so that a slight negative pressure from an atmospheric pressure is applied to the nozzle N of the head 3.

The flow pump 44c and the electromagnetic valve V1 are installed in the second circulation flow path 45c for causing the liquid to flow from the pressure reduction control liquid tank 43b, which is a pressure reduction tank, to the pressure increase control liquid tank 43a, which is a pressure increase tank. When a liquid ejection operation in the head 3 is executed and the liquid is supplied to the head 3, the electromagnetic valve V1 is opened and the flow pump 44c is operated to circulate the liquid in the supply flow path 45a, the first circulation flow path 45b, and the second circulation flow path 45c.

The replenishment unit 42 includes a replaceable liquid cartridge 43c in which a liquid is stored, a flow pump 44d, and an electromagnetic valve V2. In addition, the replenishment unit 42 includes the liquid replenishment flow path 45d that couples the pressure increase control liquid tank 43a and the liquid cartridge 43c. When the pressure increase control liquid tank 43a is replenished with the liquid from the liquid cartridge 43c, the electromagnetic valve V2 is opened, and the flow pump 44d is operated to cause the liquid to flow in the liquid replenishment flow path 45d.

Next, a detailed configuration of the head 3 will be described with reference to FIGS. 3 to 5. Solid arrows in FIG. 5 indicate a direction in which the liquid flows inside the head 3.

Figure 3:
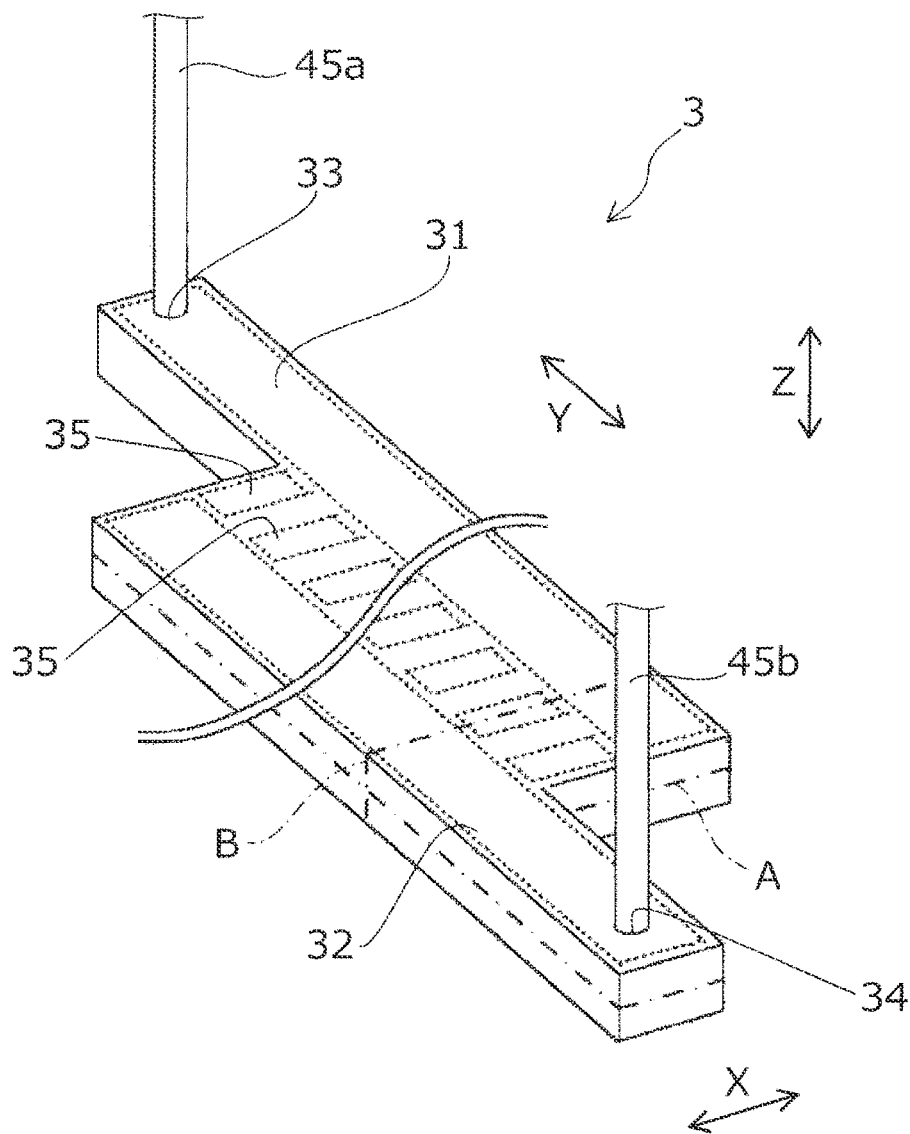
FIG. 3 is a perspective view showing a head of the three-dimensional shaping device in FIG. 1.

As shown in FIG. 3, the head 3 is coupled to the supply flow path 45a and the first circulation flow path 45b. The supply flow path 45a as a supply flow path for supplying the liquid to the inside of the head 3 and the first circulation flow path 45b as a circulation flow path for temporarily discharging the liquid inside the head 3 to the outside and circulating the liquid can be regarded as constituting a part of the head 3. In other words, the head 3 includes the supply flow path 45a and the first circulation flow path 45b. The supply flow path 45a is coupled to a supply port 33, and the first circulation flow path 45b is coupled to a discharge port 34.

Figure 4:
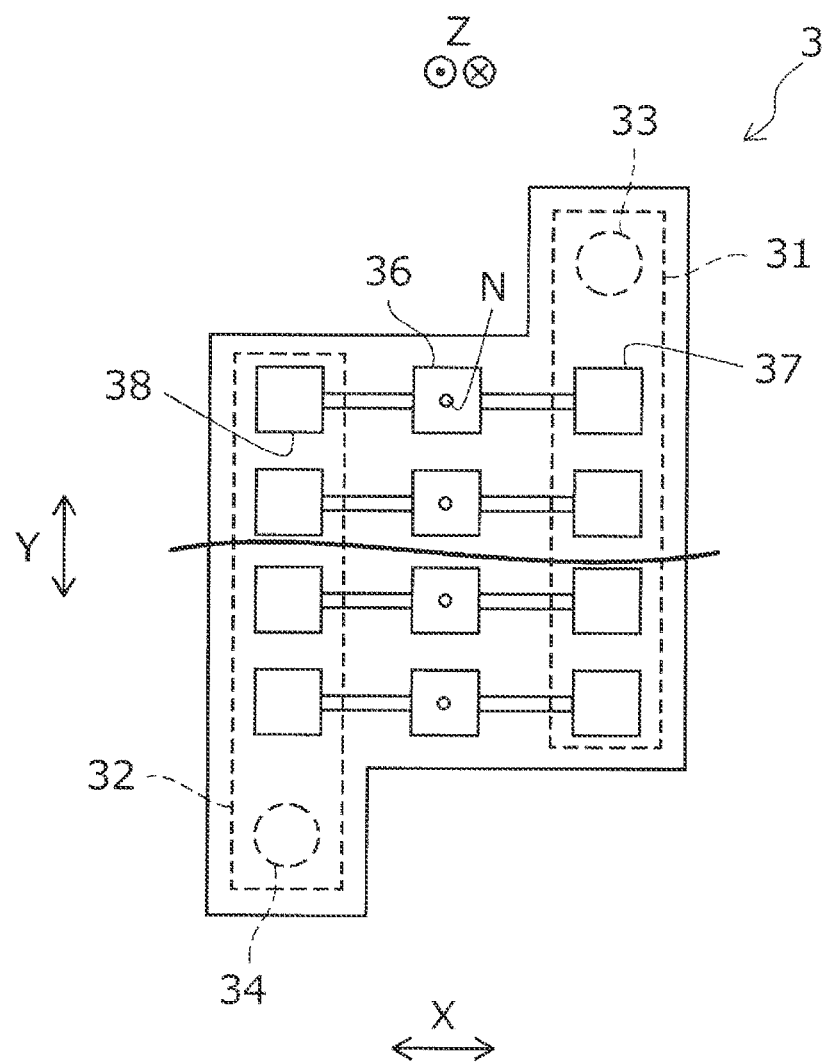
FIG. 4 is a cross-sectional view of the head of the three-dimensional shaping device in FIG. 1 taken along a dash-dotted line A in FIG. 3 as viewed from a bottom surface side, in which a part of constituent members are seen through and shown by broken lines.
Figure 5:
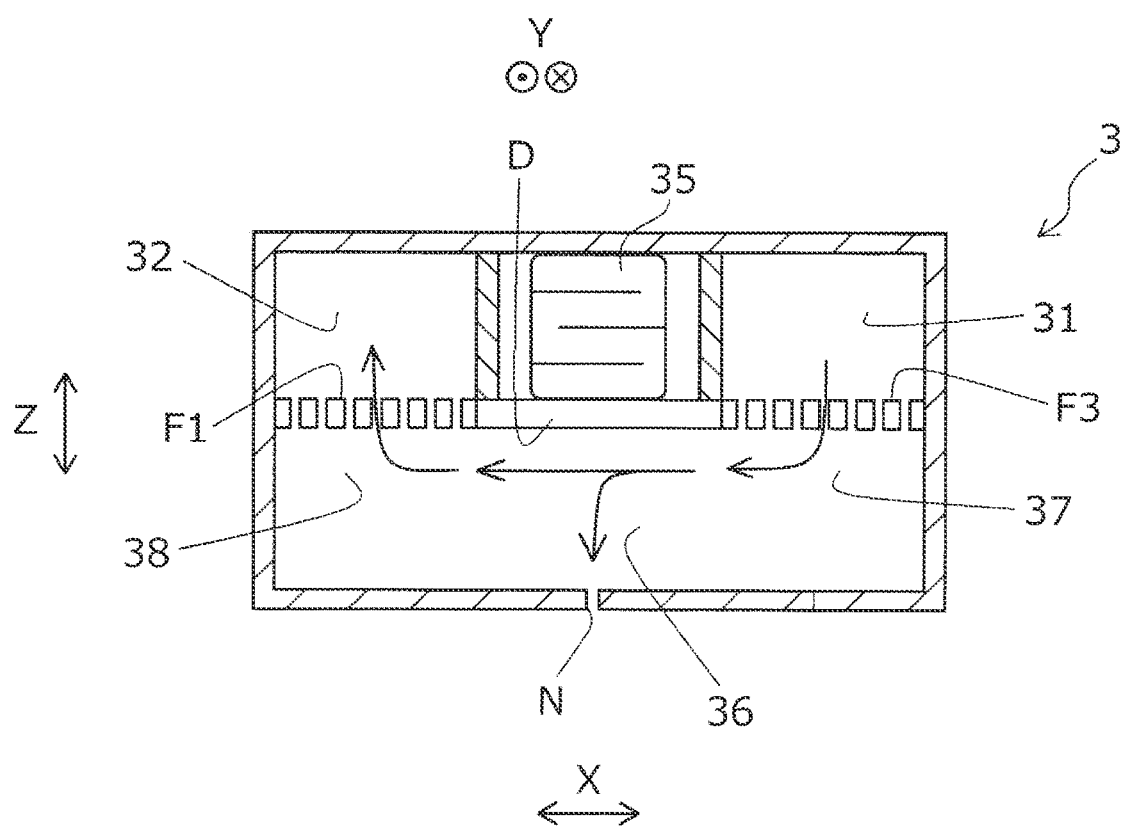
FIG. 5 is a cross-sectional side view of the head of the three-dimensional shaping device in FIG. 1, taken along a dash-dotted line B in FIG. 3.

As shown in FIGS. 3 to 5, the head 3 includes a supply liquid chamber 31 including the supply port 33, and the liquid is sent from the supply flow path 45a to the supply liquid chamber 31 via the supply port 33. As shown in FIGS. 4 and 5, the head 3 includes an individual supply flow path 37 communicating with the supply liquid chamber 31 via a filter F3, and the liquid supplied to the supply liquid chamber 31 is sent to the individual supply flow path 37.

As shown in FIGS. 3 and 5, the head 3 includes piezoelectric elements 35 that is deformed along the Z direction when a voltage is applied, and the piezoelectric elements 35 are disposed in a space opposite to the pressure chamber 36 with a diaphragm D interposed therebetween in the Z direction. As shown in FIGS. 4 and 5, the pressure chamber 36 communicates with the individual supply flow path 37, and the liquid is sent from the individual supply flow path 37 to the pressure chamber 36. Further, the nozzle N communicates with the pressure chamber 36, a volume of the pressure chamber 36 is contracted by deformation of the piezoelectric elements 35, and the liquid in the pressure chamber 36 is pressurized, whereby the liquid is ejected from the nozzle N. A downward direction in FIG. 5 is a vertical downward direction, and an ejection direction of the liquid from the nozzle N is the vertical downward direction corresponding to a gravity direction.

As described above, the three-dimensional shaping device 1 according to the present embodiment includes the liquid supply system 40 shown in FIG. 2, and circulates and supplies the liquid to be supplied to the head 3. Therefore, in order to circulate the liquid once sent to the pressure chamber 36, the pressure chamber 36 also communicates with an individual circulation flow path 38 in addition to the individual supply flow path 37. The individual circulation flow path 38 communicates with a circulation liquid chamber 32 including the discharge port 34 via a filter F1. The three-dimensional shaping device 1 according to the present embodiment circulates the liquid by causing the liquid to flow through the supply flow path 45a, the supply liquid chamber 31, the individual supply flow path 37, the pressure chamber 36, the individual circulation flow path 38, the circulation liquid chamber 32, and the first circulation flow path 45b, inside the head 3.

As described above, the head 3 includes the pressure chamber 36 communicating with the nozzle N; the supply flow path 45a, the supply liquid chamber 31, and the individual supply flow path 37 which are serving as a supply path for supplying the liquid containing the binder to the pressure chamber 36; and the individual circulation flow path 38, the circulation liquid chamber 32, and the first circulation flow path 45b which are serving as a circulation path into which the liquid containing the binder flows from the pressure chamber 36 for circulation. Here, the liquid containing the binder may contain a solid component or the like, and as described above, the head 3 is provided with the circulation path for circulating the liquid containing the binder. Therefore, by circulating the liquid, it is possible to prevent precipitation of the solid component contained in the liquid, and it is possible to prevent a problem associated with the precipitation of the solid component.

The control unit 12 controls such that q2/q1 is equal to or greater than 0.05 and equal to or less than 20, where q1 is a flow rate of the liquid containing the binder and flowing into the circulation path per unit time and q2 is a maximum flow rate of the liquid containing the binder and ejected from the nozzle N per unit time. That is, the three-dimensional shaping device 1 according to the present embodiment controls the flow rate of the liquid containing the binder and flowing into the circulation path within an appropriate range. As a result, it is possible to prevent an increase in a pressure difference between a pressure applied to the liquid in the nozzle N and an outside air pressure. The three-dimensional shaping device 1 according to the present embodiment can prevent mixing of the powder forming the layers 500 into the nozzle N by preventing an increase in the pressure difference.

In a normal state, the control unit 12 sets q2/q1 to 0.05. That is, the three-dimensional shaping device 1 according to the present embodiment controls the flow rate of the liquid containing the binder and flowing into the circulation path within a particularly preferable range. As a result, the three-dimensional shaping device 1 according to the present embodiment can particularly effectively prevent an increase in the pressure difference between the pressure applied to the liquid in the nozzle N and the outside air pressure, and can particularly effectively prevent mixing of the powder forming the layers 500 into the nozzle N.

Next, a specific example of the shaping material that can be used by the three-dimensional shaping device 1 according to the present embodiment will be described. As a metal powder that can be contained in the shaping material forming the layers 500, for example, a single powder of magnesium (Mg), iron (Fe), cobalt (Co), chromium (Cr), aluminum (Al), titanium (Ti), copper (Cu), or nickel (Ni), a powder of an alloy containing one or more of these metals (maraging steel, stainless steel (SUS), cobalt chromium molybdenum, a titanium alloy, a nickel alloy, an aluminum alloy, a cobalt alloy, or a cobalt chromium alloy), or a mixed powder thereof can be used.

As a ceramic powder that can be contained in the shaping material forming the layers 500, for example, silicon dioxide ($SiO_2$), titanium dioxide ($TiO_2$), aluminum oxide ($Al_2O_3$), zirconium oxide ($ZrO_2$), silicon nitride ($Si_3N_4$) can be preferably used.

As a resin particle that can be contained in the shaping material forming the layers 500 or the binder contained in the liquid to be ejected from the head 3 to the shaping region P1, for example, PMMA (acrylic), ABS (acrylonitrile-butadiene-acrylic acid ester), ASA (acrylonitrile-styrene-acrylic acid ester), PLA (polylactic acid), PEI (polyetherimide), PC (polycarbonate), PP (polypropylene), PE (polyethylene), PA (polyamide), EP (epoxy), PPS (polyphenylene sulfide), PS (polystyrene), paraffin wax, PVA (polyvinyl alcohol), carboxymethyl cellulose, polyoxymethylene, polymethyl methacrylate can be preferably used. In addition, for example, an acrylic resin, an epoxy resin, a silicone resin, a cellulose-based resin, or other synthetic resins can be used alone or in combination. Further, a thermoplastic resin, an ultraviolet curing resin of a type using radical polymerization of an unsaturated double bond such as acrylic, or a type using cationic polymerization such as epoxy can also be used.

Examples of a solvent contained in the liquid ejected from the head 3 include water; (poly) alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; and ionic liquids such as tetraalkylammonium acetate (for example, tetrabutylammonium acetate), and one or two or more selected from these can be used in combination.

Figure 6:
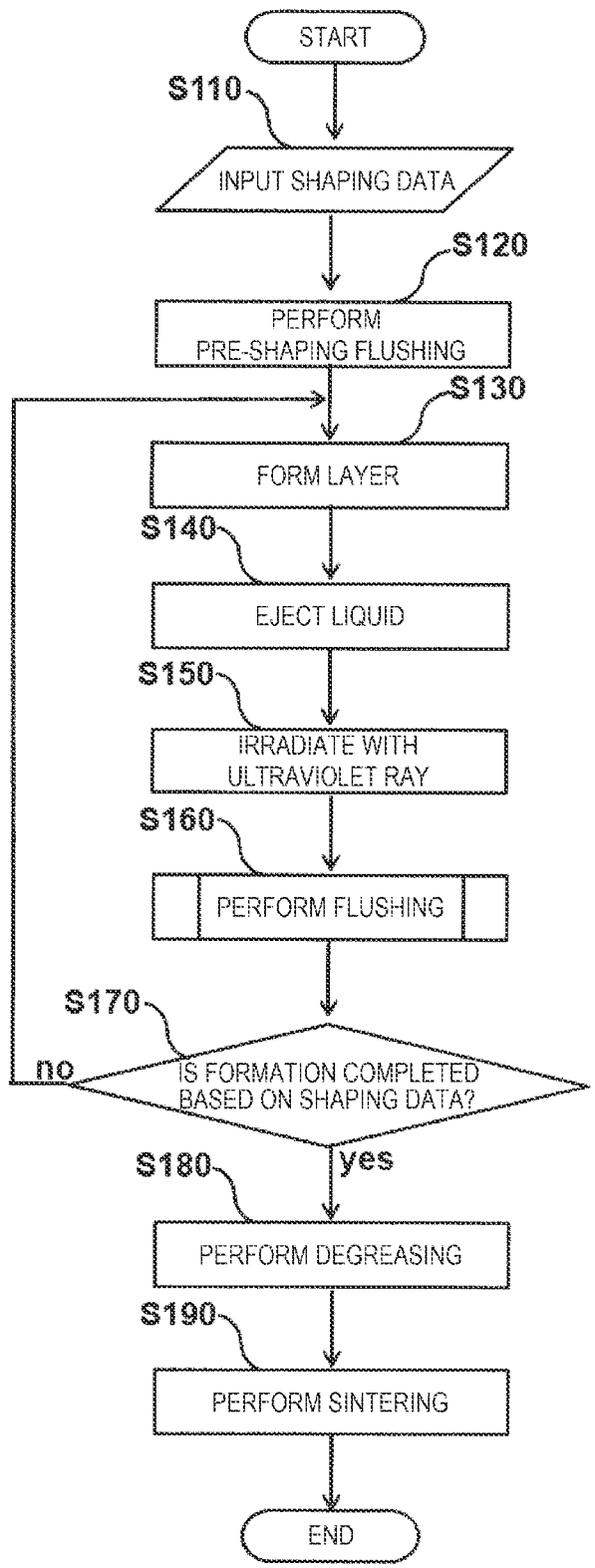
FIG. 6 is a flow chart of a three-dimensional shaping method performed by using the three-dimensional shaping device in FIG. 1.
Figure 7:
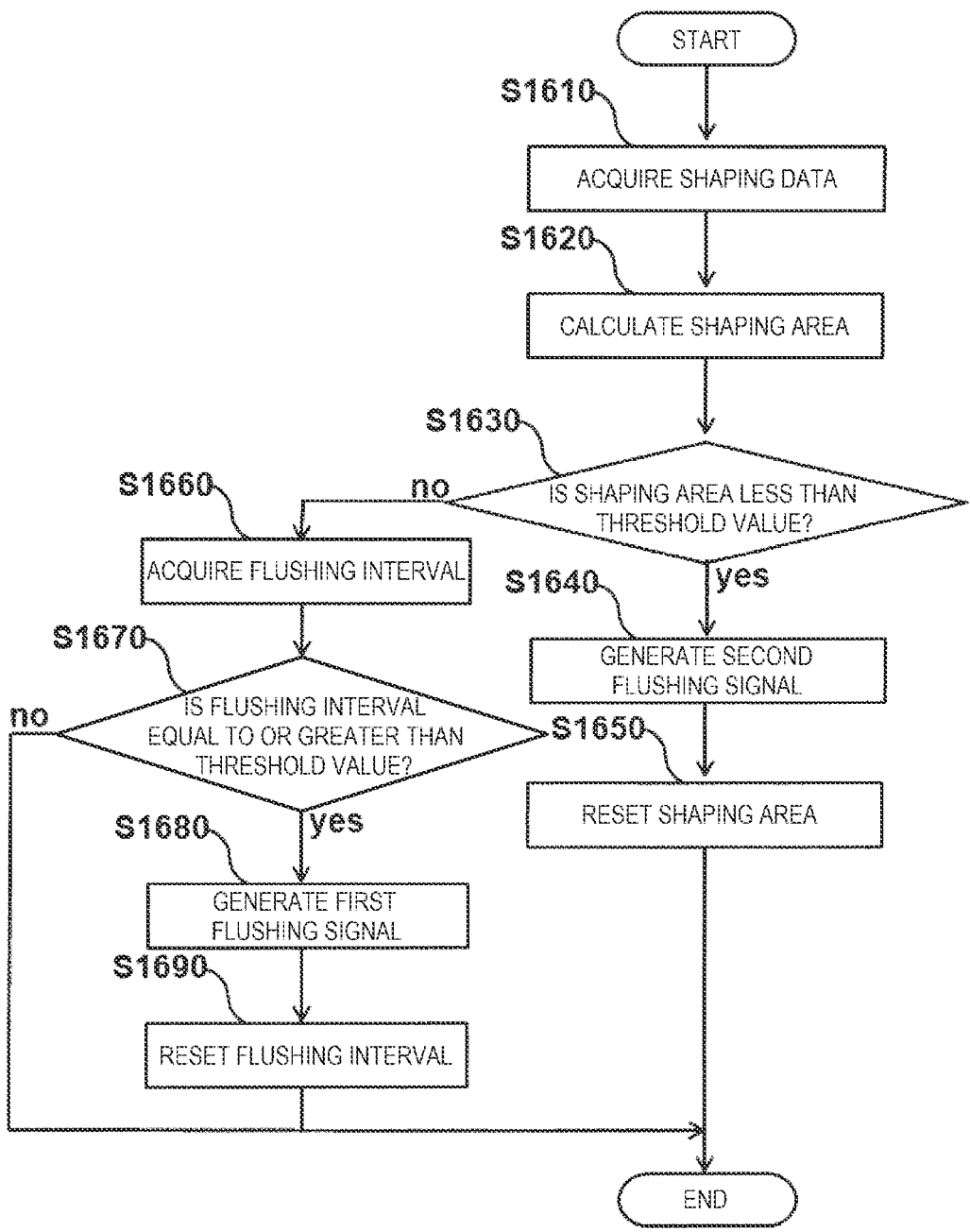
FIG. 7 is a flow chart showing flushing processing in the flow chart in FIG. 6.
Figure 8:
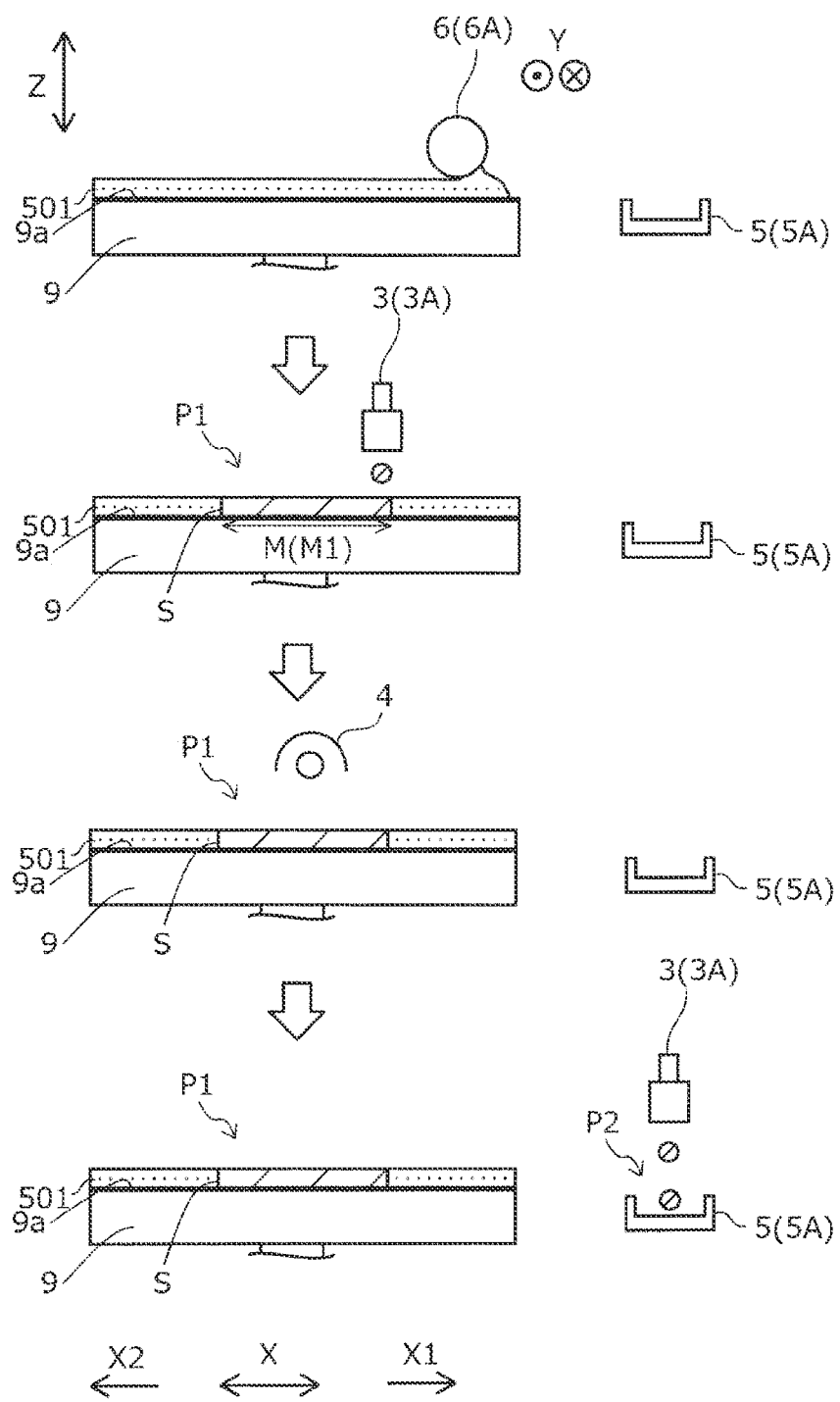
FIG. 8 is a schematic view illustrating the three-dimensional shaping method performed by using the three-dimensional shaping device in FIG. 1, and is a view showing a state where a first layer is formed.
Figure 9:
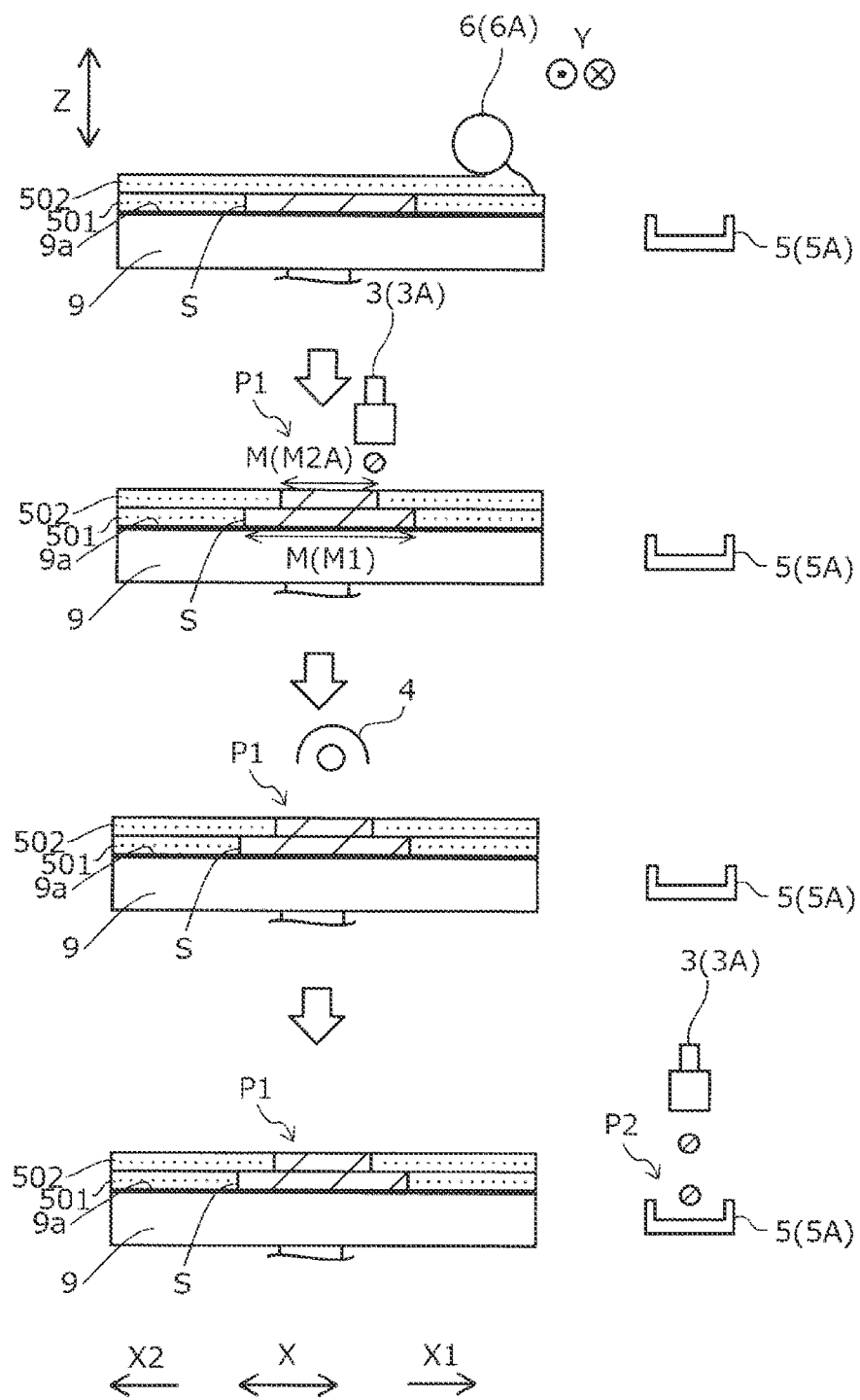
FIG. 9 is a schematic view illustrating the three-dimensional shaping method performed by using the three-dimensional shaping device in FIG. 1, and is a view showing a state where a supply unit is moved in a direction the same as that in forming the first layer to form a second layer.
Figure 10:
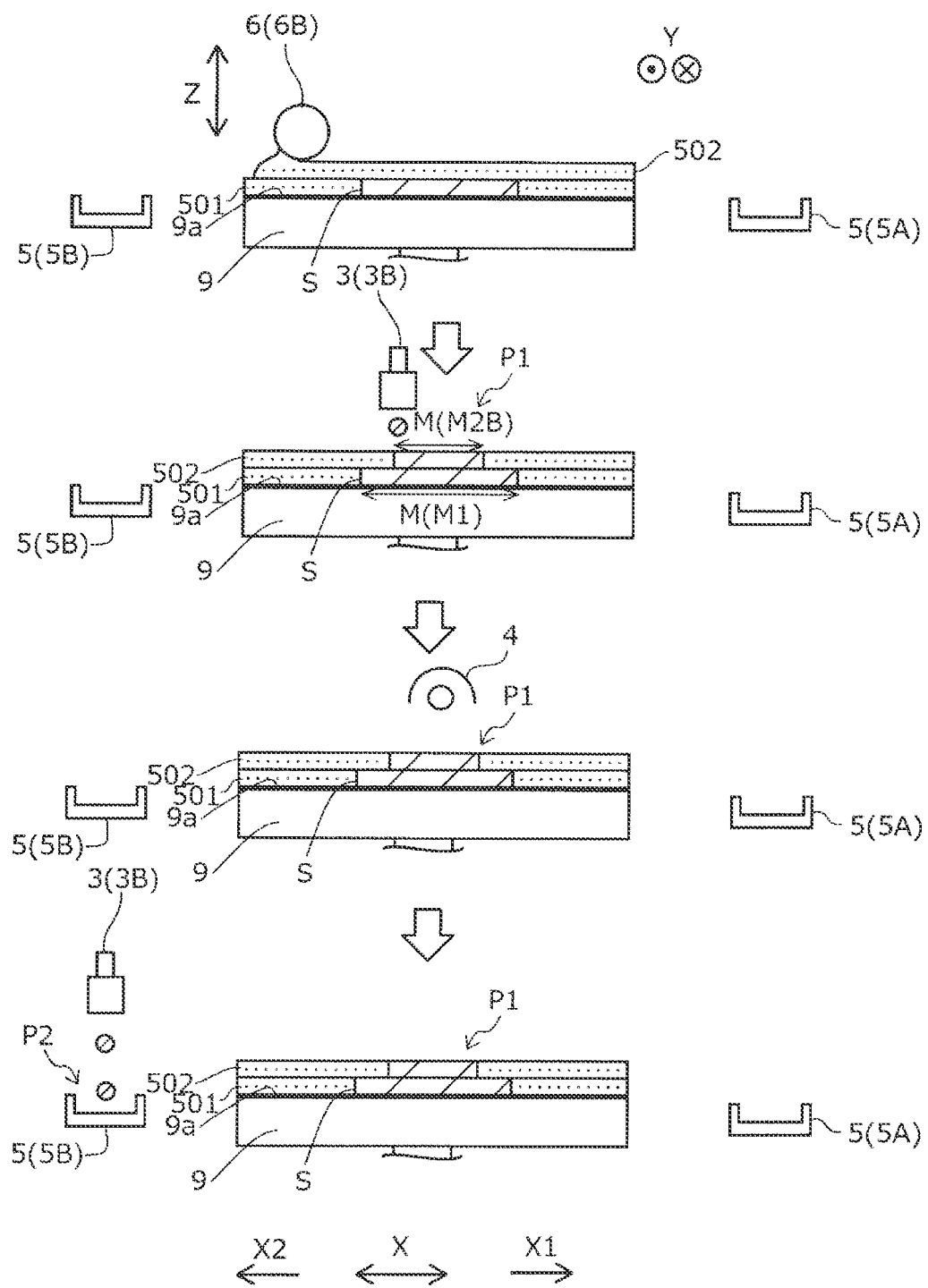
FIG. 10 is a schematic view illustrating the three-dimensional shaping method performed by using the three-dimensional shaping device in FIG. 1, and is a view showing a state where the supply unit is moved in a direction opposite to that in forming the first layer to form a second layer.

Next, an example of a three-dimensional shaping method that can be executed by using the three-dimensional shaping device 1 according to the present embodiment will be described with reference to FIGS. 8 to 11 and using flow charts in FIGS. 6 and 7. The flow chart in FIG. 7 specifically shows the flushing processing in step S160 in the flow chart in FIG. 6. The three-dimensional shaping method according to the present embodiment shown by the flow charts in FIGS. 6 and 7 is performed by the control unit 12 controlling each constituent member of the three-dimensional shaping device 1 such as the supply unit 8 and the shaping table 9. FIG. 8 shows an example of forming the layer 501 that is a first layer of the layers 500. FIGS. 9 and 10 show an example of forming the second layer 502 of the layers 500.

The three-dimensional shaping device 1 according to the present embodiment can form the layers 500 by moving the supply unit 8 in the X1 direction when forming each layer 500. Further, when each layer 500 is formed, the layers 500 can be formed by moving the supply unit 8 in the X1 direction in an odd-numbered layer 500 and moving the supply unit 8 in the X2 direction in an even-numbered layer 500. Here, FIG. 9 shows an example of forming the layers 500 by moving the supply unit 8 in the X1 direction not only when the layer 501 which is the odd-numbered layer 500 is formed but also when the layer 502 which is the even-numbered layer 500 is formed. FIG. 10 shows an example of forming the layers 500 by moving the supply unit 8 in the X1 direction when the odd-numbered layer 500 is formed and moving the supply unit 8 in the X2 direction when the even-numbered layer 500 is formed.

As shown in FIG. 6, first, in shaping data input processing in step S110, shaping data of a three-dimensional shaped object to be manufactured is input. An input source of the shaping data of the three-dimensional shaped object is not particularly limited, and the shaping data can be input to the three-dimensional shaping device 1 using the external device 20.

Next, in pre-shaping flushing processing in step S120, pre-shaping flushing is performed on the head 3. Here, the pre-shaping flushing is performed by moving the head 3 to the flushing position P2, which is the flushing position, facing the liquid receiving unit 5, and performing the pre-shaping flushing at the flushing position P2. The pre-shaping flushing processing in step S120 may be omitted.

Next, in layer forming processing in step S130, the shaping material is supplied from the shaping material supply units 2 to the shaping surface 9a of the shaping table 9, and the shaping material is compressed and leveled by the rollers 6 to form the layers 500. Here, the uppermost state in FIG. 8 represents a state where the supply unit 8 is moved in the X1 direction to form the first layer 501. The uppermost state in FIG. 9 represents a state where the supply unit 8 is moved in the X1 direction to form the second layer 502. In this way, when forming the layer 500 by moving the supply unit 8 in the X1 direction, the layer 500 is formed by supplying the shaping material from the shaping material supply unit 2A and compressing and leveling the shaping material by the roller 6A. On the other hand, as shown in the uppermost state in FIG. 10, when forming the layer 500 by moving the supply unit 8 in the X2 direction, the layer 500 is formed by supplying the shaping material from the shaping material supply unit 2B and compressing and leveling the shaping material by the roller 6B.

Next, in liquid ejection processing in step S140, the liquid containing the binder is ejected from the nozzle N of the head 3 to the shaping region P1 of the three-dimensional shaped object in the layer 500. A second state from the top in FIG. 8 represents a state where the liquid is ejected from the nozzle N of the head 3 to the shaping region P1 of the layer 501 while the supply unit 8 is moved in the X1 direction. A second state from the top in FIG. 9 represents a state where the liquid is ejected from the nozzle N of the head 3 to the shaping region P1 of the layer 501 while the supply unit 8 is moved in the X1 direction. In this way, when the layer 500 is formed by moving the supply unit 8 in the X1 direction, the liquid is ejected from the head 3A. On the other hand, as shown in a second state from the top in FIG. 10, when the layer 500 is formed by moving the supply unit 8 in the X2 direction, the liquid is ejected from the head 3B.

Next, in ultraviolet ray irradiation processing in step S150, the ultraviolet ray irradiation unit 4 irradiates the shaping region P1 of the three-dimensional shaped object in the layer 500 with ultraviolet rays. A third state from the top in FIG. 8 represents a state where the ultraviolet ray irradiation unit 4 irradiates the shaping region P1 of the three-dimensional shaped object in the layer 501 with ultraviolet rays while the supply unit 8 is moved in the X1 direction. A third state from the top in FIG. 9 represents a state where the ultraviolet ray irradiation unit 4 irradiates the shaping region P1 of the three-dimensional shaped object in the layer 502 with ultraviolet rays while the supply unit 8 is moved in the X1 direction. A third state from the top in FIG. 10 represents a state where the ultraviolet ray irradiation unit 4 irradiates the shaping region P1 of the three-dimensional shaped object in the layer 502 with ultraviolet rays while the supply unit 8 is moved in the X1 direction.

Next, in the flushing processing in step S160, flushing of the head 3 is performed. Here, as shown in the lowermost state in FIG. 8 and the lowermost state in FIG. 9, when the layer 500 is formed by moving the supply unit 8 in the X1 direction, flushing of the head 3A is performed at the flushing position P2 on a side facing the liquid receiving unit 5A. Following the flushing of the head 3A, the flushing of the head 3B can also be performed at the flushing position P2 on the side facing the liquid receiving unit 5A. On the other hand, as shown in the lowermost state in FIG. 10, when the layer 500 is formed by moving the supply unit 8 in the X2 direction, flushing of the head 3B is performed at the flushing position P2 on a side facing the liquid receiving unit 5B. Following the flushing of the head 3B, the flushing of the head 3A can also be performed at the flushing position P2 on the side facing the liquid receiving unit 5B.

Here, the flushing processing in step S160 will be described in detail with reference to FIG. 7. As shown in FIG. 7, when the flushing processing is started, first, in shaping data acquisition processing in step S1610, the control unit 12 acquires slice data corresponding to one layer 500 among the shaping data input in the shaping data input processing in step S110.

Next, in shaping area calculation processing in step S1620, a shaping area M, which is an area of the shaping region P1, is calculated by the control unit 12 based on the slice data which is bitmap data for one layer of the shaping data acquired in the shaping data acquisition processing in step S1610. Then, in shaping area determination processing in step S1630, the control unit 12 determines whether the shaping area M is less than a threshold value.

When it is determined in the shaping area determination processing in step S1630 that the shaping area M is less than the threshold value, the process proceeds to second flushing signal generation processing in step S1640, and the control unit 12 generates a second flushing signal and executes a second flushing operation based on the second flushing signal. Then, in shaping area resetting processing in step S1650, information related to the shaping area M is reset, and the flushing processing in step S160 in FIG. 6 shown by the flow chart in FIG. 7 is completed.

When it is determined in the shaping area determination processing in step S1630 that the shaping area M is equal to or greater than the threshold value, the process proceeds to flushing interval acquisition processing in step S1660, and the control unit 12 acquires a flushing interval which is a time from a last execution of the flushing processing in step S160 in the flow chart in FIG. 6. Then, in flushing interval determination processing in step S1670, the control unit 12 determines whether the flushing interval is equal to or greater than a threshold value. When it is determined in the flushing interval determination processing in step S1670 that the flushing interval is less than the threshold value, the flushing processing in step S160 in FIG. 6 shown by the flowchart in FIG. 7 is completed. That is, when the flushing interval is short and it is considered that almost no powder is mixed into the nozzle N, the flushing operation is temporarily suspended. As will be described later, when the flushing interval is long and it is considered that there is a high possibility that powder is mixed into the nozzle N, the flushing operation is executed.

On the other hand, when it is determined in the flushing interval determination processing in step S1670 that the flushing interval is equal to or greater than the threshold value, the process proceeds to first flushing signal generation processing in step S1680, and the control unit 12 generates a first flushing signal and executes the first flushing operation based on the first flushing signal. Then, in flushing interval resetting processing in step S1690, information related to the flushing interval is reset, and the flushing processing in step S160 in FIG. 6 shown by the flow chart in FIG. 7 is completed. With completion of the flushing processing in step S160 in FIG. 6 shown by the flow chart in FIG. 7, the process proceeds to shaping data completion determination processing in step S170 in the flow chart in FIG. 6.

In the second state from the top in FIG. 8, the shaping area M of the layer 501 is a shaping area M1. In the second state from the top in FIG. 9, the shaping area M of the layer 502 is a shaping area M2A. In the second state from the top in FIG. 10, the shaping area M of the layer 502 is a shaping area M2B. The shaping area M1 of the layer 501 in the second state from the top in FIG. 8 is large, and is equal to or greater than the threshold value in the shaping area determination processing in step S1630. Therefore, in such a case, it is determined that flushing does not have to be performed or weak flushing is sufficient, and after the shaping area determination processing in step S1630 is completed, the process proceeds to the flushing interval acquisition processing in step S1660. On the other hand, the shaping area M2A of the layer 502 in the second state from the top in FIG. 9 and the shaping area M2B of the layer 502 in the second state from the top in FIG. 10 are small and less than the threshold value. Therefore, in such a case, it is determined that strong flushing is necessary, and the process proceeds to the second flushing signal generation processing in step S1640.

Although the three-dimensional shaping device 1 according to the present embodiment includes the plurality of nozzles N in the head 3, the flushing operation of either the first flushing operation or the second flushing operation can be uniformly executed on all the nozzles N under the same condition regardless of the number of the nozzles N used for forming the structure S of the three-dimensional shaped object. It is noted that the present disclosure is not limited to such a configuration, and an area of the structure S of the three-dimensional shaped object to be formed for each nozzle N maybe determined, and whether to execute the first flushing operation or the second flushing operation may be changed for each nozzle N. It should be noted that the second flushing operation corresponds to a stronger flushing operation than the first flushing operation, and how to set the second flushing operation to a stronger flushing operation than the first flushing operation will be described later.

Returning to the flow chart in FIG. 6, in the shaping data completion determination processing in step S170, the control unit 12 of the three-dimensional shaping device 1 determines whether formation of all the layers 500 is completed based on the shaping data input in step S110. When it is determined that the formation of the layers 500 is not completed, the process returns to the layer forming processing in step S130, and the next layer 500 is formed. On the other hand, when it is determined that the formation of the layers 500 is completely completed, the process proceeds to degreasing processing in step S180.

In the degreasing processing in step S180, a resin component of the structure S manufactured by repeating from the pre-shaping flushing processing in step S120 to the shaping data completion determination processing in step S170, such as a binder, is degreased using an external device or the like. Examples of the degreasing method include, but are not particularly limited to, a method of volatilizing the resin component by heating and a method of dissolving the resin component by immersing the structure S in a solvent. Note that the degreasing processing in step S180 may be omitted depending on a type of the three-dimensional shaped object to be manufactured, for example, when the three-dimensional shaped object formed of resin is manufactured.

Then, in sintering processing in step S190, the structure S degreased using the external device or the like in the degreasing processing in step S180 is heated to sinter the shaping material. Even when the resin component such as a binder of the structure S remains even after the degreasing processing in step S180 is performed, the resin component is removed as the sintering processing in step S190 is executed. Then, along with completion of the sintering processing in step S190, a method for manufacturing the three-dimensional shaped object according to the present example is completed. As in the degreasing processing in step S180, the sintering processing in step S190 may be omitted depending on the type of the three-dimensional shaped object to be manufactured or the like.

In summary, in the three-dimensional shaping device 1 according to the present embodiment, the control unit 12 controls the head 3 to execute the first flushing operation when the shaping area M, which is the area of the shaping region P1, is equal to or greater than the threshold value, and controls the head 3 to execute the second flushing operation under a flushing condition different from that of the first flushing operation when the shaping area M is less than the threshold value. That is, the flushing condition is made different between a case where the shaping area M is wide and a case where the shaping area M is narrow. Here, when the liquid is discharged to the layers 500 which are powder layers, a portion at which the liquid is discharged becomes wet due to the liquid and the powder is less likely to float up. That is, the fact that the shaping area M is wide means that the region in which the powder is less likely to float up is wide, and the fact that the shaping area M is narrow means that the region in which the powder is less likely to float up is narrow. For this reason, in the three-dimensional shaping device 1 according to the present embodiment, when the shaping area M is narrow and the time during which the head 3 is moved on the region of the powder layer that is not wet due to the liquid in an idle running state becomes long, it is possible to discharge the ink in the head 3 under a condition in which a flushing effect is high. Therefore, in the three-dimensional shaping device 1 according to the present embodiment, it is possible to prevent the powder mixed into the nozzle N from not being removed even though the flushing operation is performed. The "idle running state" in the present embodiment indicates a state in which the head 3 is moved on the powder layer or a state in which the head 3 stays on the powder layer in a state where no liquid droplet is ejected from the nozzle N of the head 3.

The three-dimensional shaping device 1 according to the present embodiment is configured to execute the first flushing operation when the shaping area M is equal to or greater than the threshold value and execute the second flushing operation when the shaping area M is less than the threshold value. The three-dimensional shaping device 1 may also be configured to execute the first flushing operation when the shaping area M exceeds the threshold value and execute the second flushing operation when the shaping area M is equal to or less than the threshold value. Further, a plurality of threshold values may be set, and in addition to the first flushing operation and the second flushing operation, a flushing operation may be performed under flushing conditions different from those of the first flushing operation and the second flushing operation.

Here, how to make the second flushing operation stronger than the first flushing operation will be described below. The three-dimensional shaping device 1 according to the present embodiment can make a frequency of a waveform input to the head 3 in the second flushing operation higher than a frequency of a waveform input to the head 3 in the first flushing operation. When the frequency of the waveform input to the head 3 is increased, the powder mixed into the nozzle can be effectively discharged, and therefore, in the three-dimensional shaping device 1 according to the present embodiment, the powder mixed into the nozzle N can be effectively discharged even when the shaping area M is narrow and the time during which the head 3 is moved on the region of the layers 500 which are powder layers that are not wet due to the liquid in an idle running state becomes long.

Further, the three-dimensional shaping device 1 according to the present embodiment can make a voltage to be applied to the head 3 in the second flushing operation higher than a voltage to be applied to the head 3 in the first flushing operation. When the voltage applied to the head 3 is increased, the powder mixed into the nozzle N can be effectively discharged, and therefore, in the three-dimensional shaping device 1 according to the present embodiment, the powder mixed into the nozzle N can be effectively discharged even when the shaping area M is narrow and the time during which the head 3 is moved on the region of the layers 500 which are powder layers that are not wet due to the liquid in an idle running state becomes long.

Further, the three-dimensional shaping device 1 according to the present embodiment can make an ejection speed of the liquid from the head 3 in the second flushing operation faster than an ejection speed of the liquid from the head 3 in the first flushing operation by adjusting the voltage to be applied to the head 3 and the waveform when the voltage is applied to the head 3. When the ejection speed of the liquid from the head 3 is increased, the powder mixed into the nozzle N can be effectively discharged, and therefore, in the three-dimensional shaping device 1 according to the present embodiment, the powder mixed into the nozzle N can be effectively discharged even when the shaping area M is narrow and the time during which the head 3 is moved on the region of the layers 500 which are powder layers that are not wet due to the liquid in an idle running state becomes long.

Further, the three-dimensional shaping device 1 according to the present embodiment can make a droplet size of the liquid ejected from the head 3 in the second flushing operation greater than a droplet size of the liquid ejected from the head 3 in the first flushing operation by adjusting the voltage to be applied to the head 3 and the waveform when the voltage is applied to the head 3. When the ejection amount of the liquid from the head 3 is increased, the powder mixed into the nozzle N can be effectively discharged, and therefore, in the three-dimensional shaping device 1 according to the present embodiment, the powder mixed into the nozzle N can be effectively discharged even when the shaping area M is narrow and the time during which the head 3 is moved on the region of the layers 500 which are powder layers that are not wet due to the liquid in an idle running state becomes long.

The present disclosure is not limited to the embodiments described above, and can be implemented in various configurations without departing from the scope of the disclosure. For example, in order to solve some or all of problems described above, or to achieve some or all of effects described above, technical characteristics in the embodiments corresponding to the technical characteristics in each embodiment described in the summary of the disclosure can be replaced or combined as appropriate. In addition, when the technical characteristics are not described as essential in the present description, the technical characteristics can be appropriately deleted.

What is claimed is:

1. A three-dimensional shaping device, comprising:
   a shaping table;
   a layer forming unit configured to form a powder layer on the shaping table;
   a liquid supply system comprising:
     a pressure increase control liquid tank;
     a pressure reduction control liquid tank; and
     a head configured to eject a liquid containing a binder from a nozzle to a shaping on the powder layer, wherein
       the head includes a pressure chamber communicating with the nozzle,
       a supply path couples the pressure increase control liquid tank and the head and is configured to supply the liquid from the pressure increase control liquid tank to the pressure chamber,
       a circulation path couples the pressure chamber and the nozzle and is configured to flow the liquid from the pressure chamber to the nozzle for circulation, and
       a differential pressure control is performed by the pressure increase control liquid tank and the pressure reduction control liquid tank so that a slight negative pressure from an atmospheric pressure is applied to the nozzle of the head; and
   a control unit configured to control movement of the head with respect to the shaping table and driving of the head by applying a voltage, and to control the head to execute a flushing operation at a flushing position which is a position different from a shaping region, wherein
   the control unit is configured to
     calculate an area of the shaping region based on slice data for a single layer of shaping data acquired by the control unit to control movement of the head and drive the head;
     control the head to execute a first flushing operation when the area of the shaping region of the single layer is equal to or greater than a threshold value;
     control the head to execute a second flushing operation under a flushing condition different from that of the first flushing operation when the area of the shaping region of the single layer is less than the threshold value; and
     control a flow of the liquid through the head such that $q2/q1$ is equal to or greater than 0.05 and equal to or less than 20, where $q1$ is a flow rate of the liquid flowing into the circulation path per unit time, and $q2$ is a maximum flow rate of the liquid ejected from the nozzle per unit time.

2. The three-dimensional shaping device according to claim 1, wherein
   a frequency of a waveform input to the head in the second flushing operation is higher than a frequency of a waveform input to the head in the first flushing operation.

3. The three-dimensional shaping device according to claim 1, wherein
   a voltage to be applied to the head in the second flushing operation is higher than a voltage to be applied to the head in the first flushing operation.

4. The three-dimensional shaping device according to claim 1, wherein
   an ejection speed of the liquid from the head in the second flushing operation is faster than an ejection speed of the liquid from the head in the first flushing operation.

5. The three-dimensional shaping device according to claim 1, wherein
   a droplet size of the liquid ejected from the head in the second flushing operation is larger than a droplet size of the liquid ejected from the head in the first flushing operation.

6. The three-dimensional shaping device according to claim 1, wherein $q2/q1$ is 0.05.

7. The three-dimensional shaping device according to claim 1, wherein
   when the area of the shaping region of the single layer is equal to or greater than the threshold value, the control unit is configured to perform flushing interval acquisition processing and acquire a flushing internal,
   when the flushing interval is less than the threshold value, the flushing operation is completed, or
   when the flushing interval is equal to or greater than the threshold value, the control unit executes the first flushing operation.

* * * * *